(12) United States Patent
Wright

(10) Patent No.: US 8,716,357 B2
(45) Date of Patent: May 6, 2014

(54) HYDROPHILIC POLYMER MEMBRANES

(75) Inventor: Shaun Wright, Sheffield (GB)

(73) Assignee: ITM Power (Research) Ltd, South Yorkshire (GB)

( * ) Notice: Subject to any disclaimer, the term of this patent is extended or adjusted under 35 U.S.C. 154(b) by 92 days.

(21) Appl. No.: 12/912,970

(22) Filed: Oct. 27, 2010

(65) Prior Publication Data

US 2011/0105631 A1    May 5, 2011

(30) Foreign Application Priority Data

Nov. 2, 2009  (GB) .................................. 0919208.9
Jun. 2, 2010  (GB) .................................. 1009259.1

(51) Int. Cl.
*B01J 39/18*    (2006.01)
*B01J 41/12*    (2006.01)
*H01M 8/10*    (2006.01)

(52) U.S. Cl.
USPC ................. 521/27; 521/25; 521/46; 521/119; 427/115

(58) Field of Classification Search
USPC ................... 521/27, 34, 25, 46, 119; 427/115
See application file for complete search history.

(56) References Cited

U.S. PATENT DOCUMENTS

| | | | | |
|---|---|---|---|---|
| 5,746,917 | A  * | 5/1998 | Altmeier | 210/500.37 |
| 6,300,381 | B1 * | 10/2001 | Kerres et al. | 521/27 |
| 7,108,934 | B2 * | 9/2006 | Narayanan et al. | 429/492 |
| 7,247,370 | B2 * | 7/2007 | Childs et al. | 428/310.5 |
| 7,318,972 | B2 * | 1/2008 | Highgate | 429/483 |
| 2005/0158632 | A1 | 7/2005 | Wang Chen et al. | |
| 2006/0236857 | A1 * | 10/2006 | Sanchez et al. | 95/45 |

FOREIGN PATENT DOCUMENTS

| | | | |
|---|---|---|---|
| GB | 2 380 055 A | | 3/2003 |
| JP | 2000129010 A | * | 5/2000 |
| WO | WO 2006016068 A2 | * | 2/2006 |

* cited by examiner

*Primary Examiner* — Michael M Bernshteyn

(74) *Attorney, Agent, or Firm* — Saliwanchik, Lloyd & Eisenschenk

(57) ABSTRACT

A hydrophilic polymeric ionomer obtainable by reacting, in a solvent, components comprising a polymer and an ionic component selected from a strong acid or a strong base. The present invention also comprises methods of forming such membranes.

16 Claims, 2 Drawing Sheets

HYDROPHILIC POLYMER MEMBRANES

CROSS-REFERENCE TO A RELATED APPLICATION

This application claims priority to Great Britain Application No. 0919208.9, filed Nov. 2, 2009 and Great Britain Application No. 1009259.1, filed Jun. 2, 2010; which are incorporated herein by reference in their entirety.

FIELD OF THE INVENTION

This invention relates to solid polymer electrolyte (SPE) materials, which are useful in electrochemical cells and to the production of these materials.

BACKGROUND OF THE INVENTION

Electrochemical cells exist in which the electrodes are separated by an ion-exchange membrane, for example a solid polymer electrolyte (SPE). WO03/238980 teaches that ion-exchange materials can be produced based on hydrophilic polymers, i.e. polymers which are inherently able to absorb and transmit water through their molecular structure. Those hydrophilic polymer membranes are obtainable by the copolymerisation of a hydrophilic monomer (such as vinyl pyrrolidone), a hydrophobic monomer (such as methyl methacrylate), a monomer including a strongly ionic group (such as AMPSA) and water. It is important that the polymerisation is aqueous. This is necessary for good electrical and hydration properties.

The strongly ionic group can be cationic (forming a cationic exchange membrane) or anionic (forming an anionic exchange membrane).

Hydrophilic materials are particularly useful in hydrogen-oxygen fuel cells, since product water can be re-distributed, thereby avoiding local flooding or drying out of the membrane. In electrolysers hydrophilic membranes allow the easy transport of water to the surface and throughout the membrane. This allows water to be used on one side of the electrolyser only, reducing the balance of plant required in such systems. WO03/238980 teaches a methodology for forming ionically active sites by co-polymerisation from a solution of ionically active monomers.

SUMMARY OF THE INVENTION

It has been surprisingly been found that water is not needed in the formation of hydrophilic polymer membranes. It has been shown that good electrical properties can be achieved by forming a hydrophilic polymeric ionomer from the reaction of, in a solvent, components comprising a polymer and an ionic component selected from a strong acid or a strong base.

A further aspect of the invention is the use of the ionomer described above in a membrane electrode assembly.

Still further aspects include membrane electrode assemblies comprising an ionomer as defined above, electrolysers and fuel cells comprising these membrane electrode assemblies, and methods for forming membrane electrode assemblies.

DESCRIPTION OF PREFERRED EMBODIMENTS

Figure 1:
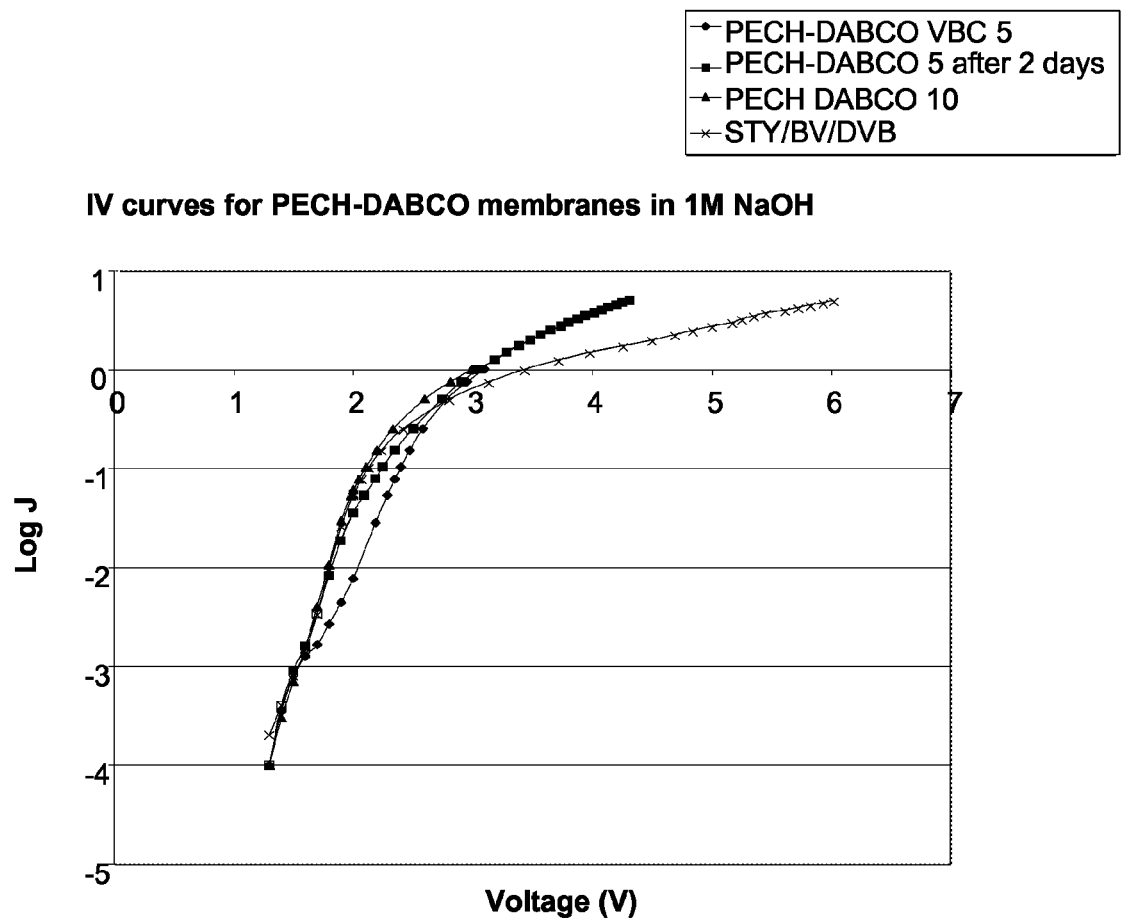
FIG. 1 is an IV curve for PECH-DABCO VBC membranes in 1M NaOH using Monel 400 catalysts.
Figure 2:
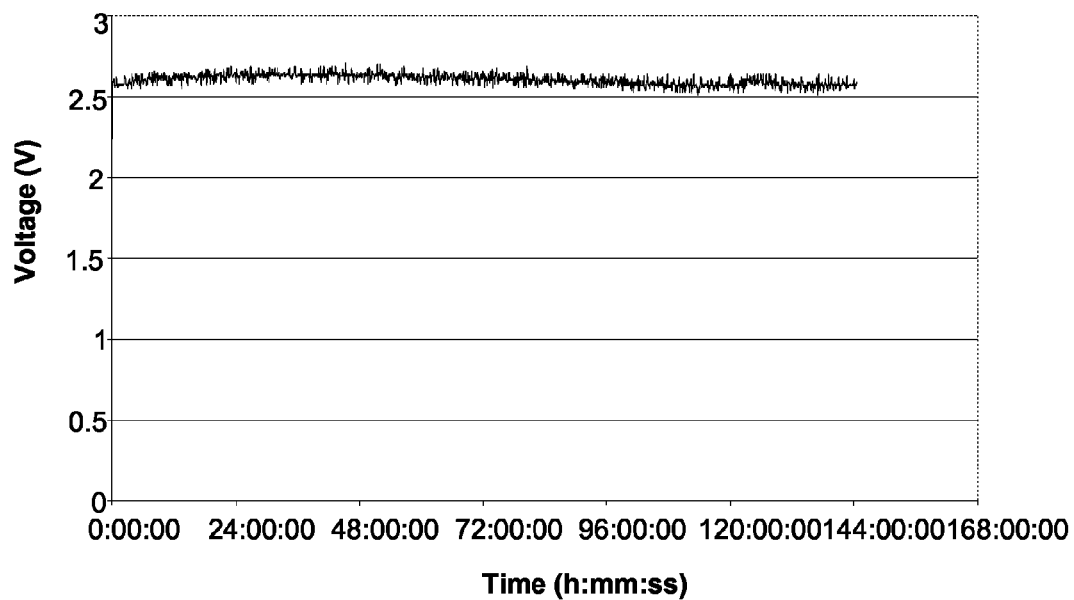
FIG. 2 is longevity testing of PECH-DABCO VBC in 1M NaOH at 40° C. It was running for 9 days with no degradation of the performance voltage.

If the components to be reacted comprise a polymerisable monomer, then preferably, the reacting comprises polymerisation. Preferably, the polymerisation is by thermal or UV polymerisation.

As used herein, a strong acid is an acid with a pKa of below about 5. Preferably, the pKa is below about 3. More preferably, the strong acid is phosphonic acid or sulphonic acid.

As used herein, a strong base is a base, which has a pKa of greater than about 8, preferably greater than about 9. More preferably, the strong base is a tertiary amine. Preferably, the strong base is a quarternary ammonium (hydroxide form).

Preferably, the polymer component is halogenated. The polymer component may be hydrophobic or hydrophilic. Preferably, the polymer component is an elastomer.

In a preferred embodiment, the polymer component is selected from a polyhalohydrin or a polyepichlorohydrin co-polymer. Examples of the polymer component are listed below:

Polyhalohydrins:
Polyepichlorohydrin (ECH Zeon chemicals, PECH), poly-bromohydrin and polyiodohydrin.

Polyepichlorohydrin Co-Polymers:
Polyepichlorohydrin-co ethylene oxide (ECO Zeon chemicals)
Polyepichlorohydrin-co-allylglycidyl ether (GCO, Zeon chemicals)
Polyepichlorohydrin-co-ethylene oxide-co-allyl glycidyl ether (GECO Zeon chemicals)

Other Possible Polymers are (Non Elastomers):
Polyvinylchloride (PVC)
Polyvinylamine (hydrophilic)
Polyvinyl alcohol (hydrophilic)

The ionic component is selected from a tertiary amine, sulphonic acid or phosphoric acid. Examples are given below:

Tertiary Amines:
Trimethylamine, triethylamine etc (NB non cross linking)
1,4-Diazabicyclo[2.2.2]octane (DABCO)
N,N,N',N'-Tetramethyldiaminomethane
N,N,N',N'-Tetramethyl-1,6-hexanediamine
N,N,N',N'-Tetramethylethylenediamine (TMEDA)
1,3,5-Trimethylhexahydro-1,3,5-triazine
1,4-Dimethylpiperazine
Quinuclidine, 3-quinuclidinol, 3 quinuclidinone (NB non cross linking)

Other possible basic groups leading to ionic species are
Tertiary Phosphines
Secondary Sulphides Preferably, the components to be reacted comprise a halogenated monomer. An example of a halogenated monomer is vinylbenzyl chloride. Preferably, the halogenated monomer is hydrophobic. More preferably, it comprises a vinyl group.

The reaction to produce an ionomer of the invention is conducted in a solvent. The solvent may be water. Preferably, the solvent is a polar aprotic solvent or a chlorinated solvent. Examples are given below:

Polar Aprotic Solvents:
Dimethylformamide (DMF)
Dimethylsulphoxide (DMSO)
N-methyl-2-pyrrolidinone (NMP)

Chlorinated Solvents:
Dichloromethane
Chloroform
1,1,2,2-Tetrachloroethane

Preferably, the components to be reacted further comprise a cross-linker. Preferably the cross-linker is a dihalo compound. Examples include:

Dihalo Cross-Linkers:
Dihaloxylene, e.g. α,α'-dichloro-p-xylene
Dihaloalkanes, e.g. 1,6-Dibromohexane
Ally methacryalte
1,4-butanediol divinyl ether
divinylbenzene
isoprene
1,5-hexadiene
2,3-dimethyl-1,3-butadiene
divinyl sulphone
1,3-Diisopropenylbenzene
5-vinyl-2-norborene
3,9-divinyl-2,4,8,10-tetraoxaspiro[5.5]undecane In a preferred embodiment, the components to be reacted further comprise an ionic monomer. Examples of ionic monomers include:
(ar-vinylbenzyl)trimethy phosphonium chloride
(ar-vinylbenzyl)trimethy ammonium chloride
Vinylphosphonic acid
2-methyl-2-propene-1-sulfonic acid sodium salt
4-vinylbenzenesulfonic acid sodium salt
Vinylsulfonic acid sodium salt Preferably, the components to be reacted also include a initiator. Examples include:
Azoisobutyronitrile
Azobiscyclohexanecarbonitrile
2-Hydroxy-2-methyl-1-phenyl-propan-1-one
2,4,6-Trimethylbenzoyl-diphenyl-phosphineoxide
1-Hydroxycyclohexylphenylketone
Ethyl-4-dimethylaminobenzoate
Isopropylthioxanthone
Methyl-o-benzoyl benzoate
2,2-dimethoxy-1,2-diphenylethan-1-one Further preferred embodiments are defined in the claims.

The ionomers of the invention have good electrical and hydration properties, as evidenced by the Examples below, and they are therefore useful in membrane electrode assemblies. These membrane electrode assemblies can be used in an electrochemical cell, such as a fuel cell or an electrolyser.

The invention will now be illustrated by the following Examples.

Example 1

PECH-DABCO VBC Membranes

| | |
|---|---|
| Polyepichlorohydrin (PECH) 2.00 g | a polyether rubber |
| 1,4-Diazobicyclo[2.2.2]octane (DABCO) 1.82 g | a bifunctional tertiary amine |
| Dimethylformamide (DMF) 18 ml | a solvent |
| Potassium iodide 0.02 g | catalyst |
| Vinylbenzyl chloride (VBC) 2.48 g | a hydrophobic vinyl monomer |
| Azoisobutyronitrile (Z) 0.10 g | thermal initiator |

Reaction of PECH with DABCO in DMF produces a hydrophilic ionic polymer from a hydrophobic polymeric rubber (elastomer). This polymer can cross link through the DABCO but swells excessively in water. This method gives improved membrane materials.

Polyepichlorohydrin (2.0 g, 21.6 mmol) was dissolved in dimethylformamide (18 g) with heating to 70° C. for 2 hours. Diazabicyclo[2.2.2]octane (1.82 g, 16.2 mmol) and potassium iodide (0.02 g) were added and continued to stir at 70° C. for 7 hours until a thick viscous gel was obtained. The gel was cooled to room temperature and vinylbenzyl chloride (2.48 g, 16.2 mmol) was added slowly with external cooling in a water bath. The mixture was allowed to stir at room temperature overnight. Azoisobutyronitrile (0.10 g) was added and stirred for 2 hours before sealing the mixture in a bag and thermally curing the membrane at 90° C. for 5 hours.

The method used here substitutes 75% of the chloromethyl PECH groups with DABCO but this can be changed towards optimisation.

The large amounts of DMF solvent required to dissolve the initial PECH results in dilute solutions to polymerise membranes from, creating weak membranes. However, we are trying to find ways to improve this by isolating either the PECH-DABCO ionic polymer (this can be done by pouring the DMF solution into acetone or ether) or the PECH-DABCO-VBC ionic polymer.

The incorporation of the VBC onto the ionic polymer is an important feature, as it allows free radical (co-)polymerisation into membranes.

Other polyether rubbers, which are co-polymers of PECH with ethylene oxide and allyl glycidyl ether, can be used in the invention. The latter group gives an allyl group hanging off the polymer backbone, which can form cross links by UV curing with dithiols.

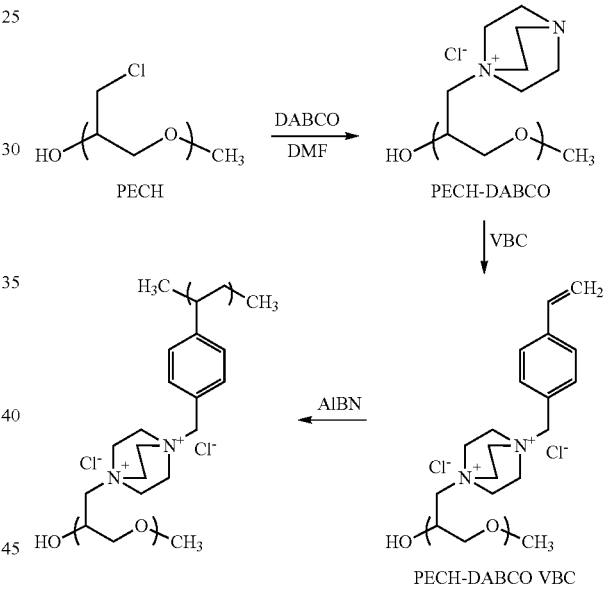

Example 2

PECH-DABCO DCX Membranes

Polyepichlorohydrin (2.00 g, 21.6 mmol) was dissolved in dimethylformamide (18.0 g) with heating at 70° C. for 2 hours. Diazabicyclo[2.2.2]octane (1.82 g, 16.2 mmol) and potassium iodide (0.02 g) were added and continued to stir at 70° C. for 7 hours until a thick viscous gel was obtained. The gel was cooled to room temperature and dichloro-p-xylene was added and quickly mixed and sealed in a bag. The membrane was placed in an oven at 90° C. for 3 hours.

Addition of dichloro-p-xylene to PECH-DABCO results in a highly cross linked polymer matrix. The reaction occurs within minutes of the powdered DCX being added to the viscous PECH-DABCO gel. A white insoluble solid is formed. The mixture is quickly mixed and sealed in a bag, and cured in an oven (no initiator is required) at 90° C. for 5 hours to complete the reaction. The resulting membrane is highly elastic, flexible and strong. When placed in DMF no change in size is observed, in acetone a small shrinkage (4%) is observed and the elasticity is lost. In water a 15% shrinkage is observed, whilst in methanol a 20% shrinkage is accompanied by an increase in elasticity. The shrinkage in water is increased when ion exchanged in 1 M NaOH, and no electrolyser performance is observed upon testing. This is probably a result of very low water content and very low permeability.

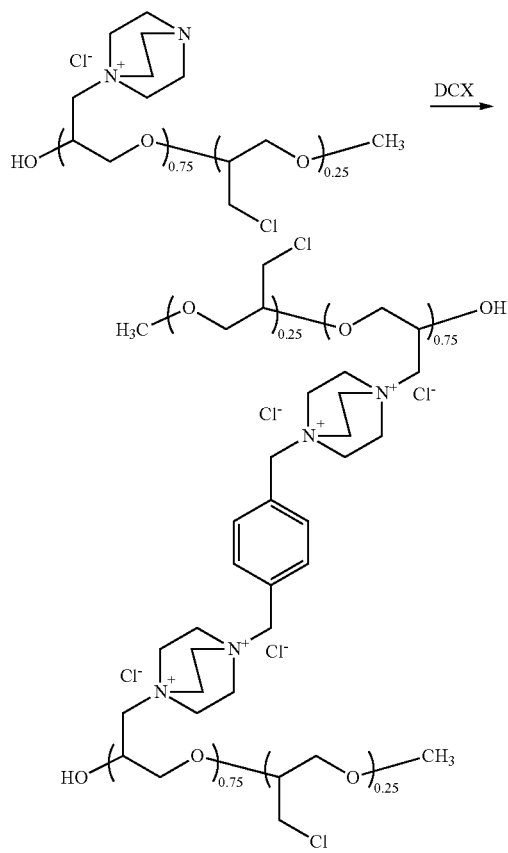

Example 3

STY/BV/VBC-DABCO Membranes

| | |
|---|---|
| Styrene | 3.75 g, 36.0 mmol |
| Vinylbenzyl trimethylammonium chloride (BV) | 7.50 g, 35.4 mmol |
| Vinylbenzyl chloride (VBC) | 3.69 g, 24.2 mmol |

-continued

| | |
|---|---|
| Diazabicyclo[2.2.2]octane (DABCO) | 1.34 g, 11.9 mmol |
| Methanol | 3.50 g |
| 1-Hydroxycyclohexyl phenyl ketone (UV8) | 0.23 g |

Diazabicyclo[2.2.2]octane (1.34 g) was dissolved in methanol (1.00 g) and added drop wise to vinylbenzyl chloride (3.69 g) at 0° C. with vigorous stirring. The mixture was allowed to warm to room temperature and stirred for a further hour. Vinylbenzyl trimethylammonium chloride (7.50 g) and more methanol (2.50 g) were added and stirred until completely dissolved. Styrene (3.75 g) and 1-Hydroxycyclohexyl phenyl ketone (0.23 g) were added and stirred for 30 minutes before sealing 8 cm$^3$ of mixture in a 12 cm$^2$ bag and curing under UV light for 20 minutes.

Longevity testing of a STY/BV/VBC-DABCO membrane showed stability in excess of 500 hours. In 1 M NaOH at 60° C. the voltage was between 2.5 V and 3 V.

The invention claimed is:

1. A hydrophilic polymeric ionomer obtained by reacting, in a solvent, components comprising a polymer, a tertiary amine, and a halogenated vinyl monomer, such that the tertiary amine and the halogenated vinyl monomer are incorporated into the polymeric ionomer.

2. The ionomer according to claim 1, wherein the halogenated vinyl monomer is hydrophobic.

3. The ionomer according to claim 1, wherein the solvent is a polar aprotic solvent or a chlorinated solvent.

4. The ionomer according to claim 1, which is cross-linked.

5. The ionomer according to claim 1, wherein the components further comprise a dihalo cross-linker.

6. The ionomer according to claim 1, wherein the components further comprise an ionic monomer.

7. The ionomer according to claim 1, wherein the polymer component is hydrophilic.

8. The ionomer according to claim 1, wherein the polymer component is hydrophobic.

9. The ionomer according to claim 1, wherein the polymer component is an elastomer.

10. A membrane electrode assembly comprising an ionomer according to claim 1.

11. An electrochemical cell comprising a membrane electrode assembly according to claim 10.

12. The electrochemical cell according to claim 11, which is a fuel cell.

13. The electrochemical cell according to claim 11, which is an electrolyser.

14. A method of forming a hydrophilic polymeric ionomer, as defined in claim 1, comprising reacting, in a solvent, components comprising a polymer, a tertiary amine, and a halogenated vinyl monomer.

15. Use of an ionomer according to claim 1, in a membrane electrode assembly, wherein the use of the ionomer comprises providing the ionomer as a component of the membrane electrode assembly.

16. A method for forming a membrane electrode assembly, comprising introducing the components and solvent, as defined in claim 1, in between two electrodes, and polymerising the components in situ.

* * * * *